United States Patent
Fujita

(10) Patent No.: US 9,571,001 B2
(45) Date of Patent: Feb. 14, 2017

(54) POWER CONVERSION DEVICE, INCLUDING SERIAL SWITCHING ELEMENT, THAT COMPENSATES FOR VOLTAGE FLUCTUATIONS

(71) Applicant: FUJI ELECTRIC CO., LTD., Kawasaki-shi (JP)

(72) Inventor: Satoru Fujita, Akishima (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 429 days.

(21) Appl. No.: 13/939,852

(22) Filed: Jul. 11, 2013

(65) Prior Publication Data
US 2013/0294124 A1 Nov. 7, 2013

Related U.S. Application Data

(63) Continuation of application No. PCT/JP2012/002477, filed on Apr. 10, 2012.

(51) Int. Cl.
| | |
|---|---|
| H02M 7/04 | (2006.01) |
| H02M 7/12 | (2006.01) |
| H02M 7/217 | (2006.01) |
| H02M 7/797 | (2006.01) |

(52) U.S. Cl.
CPC ............ *H02M 7/04* (2013.01); *H02M 7/125* (2013.01); *H02M 7/217* (2013.01); *H02M 7/797* (2013.01)

(58) Field of Classification Search
CPC ........ H02M 7/04; H02M 7/217; H02M 7/125; H02M 7/797; H02M 5/293
See application file for complete search history.

(56) References Cited

U.S. PATENT DOCUMENTS

| | | | | |
|---|---|---|---|---|
| 4,916,329 A * | 4/1990 | Dang | ................ | G05F 1/24 307/66 |
| 5,057,990 A * | 10/1991 | Gulczynski | ......... | H02M 3/1582 323/350 |
| 5,710,699 A * | 1/1998 | King | ................ | B60L 11/005 318/139 |
| 7,064,969 B2 * | 6/2006 | West | ................ | H02M 7/48 363/132 |

(Continued)

FOREIGN PATENT DOCUMENTS

| | | |
|---|---|---|
| JP | 04-145893 A | 5/1992 |
| JP | 11-178216 A | 7/1999 |

(Continued)

*Primary Examiner* — Gustavo Rosario Benitez
(74) *Attorney, Agent, or Firm* — Rossi, Kimms & McDowell LLP

(57) ABSTRACT

Aspects of the invention include a step-up/step-down chopper unit, an inverter unit, a rectifier unit, first to third voltage detection means, and a drive control unit. Voltage regulation means of the drive control unit, in accordance with a detected voltage value detected by the voltage detection means, generates control signals for keeping the effective voltage value of a capacitor constant. In some aspects of the invention, the effective voltage value of the capacitor is controlled to be constant by the switching elements of the step-up/step-down chopper unit and inverter unit being driven by the control signals. The rectifier unit can suppress a surge voltage by causing energy stored in a inductor to be absorbed by storage elements when bidirectional switching elements are turned off.

21 Claims, 11 Drawing Sheets

(56) References Cited

U.S. PATENT DOCUMENTS

| | | | |
|---|---|---|---|
| 2004/0095790 A1* | 5/2004 | Bakran | H02M 7/487 363/132 |
| 2008/0061628 A1* | 3/2008 | Nielsen | H02J 9/062 307/66 |
| 2008/0266919 A1* | 10/2008 | Mallwitz | H02M 3/158 363/124 |
| 2009/0201706 A1* | 8/2009 | Zacharias | H02M 7/48 363/123 |
| 2011/0044077 A1* | 2/2011 | Nielsen | H02J 9/062 363/37 |
| 2011/0049991 A1* | 3/2011 | Sato | H02M 1/44 307/48 |
| 2013/0039104 A1* | 2/2013 | Sharma | H02M 1/10 363/123 |
| 2014/0104889 A1* | 4/2014 | Yamada | H02M 3/335 363/16 |

FOREIGN PATENT DOCUMENTS

| | | |
|---|---|---|
| JP | 3902030 B2 | 1/2007 |
| JP | 2007-221844 A | 8/2007 |
| JP | 2010-074869 A | 4/2010 |

* cited by examiner

RELATED ART

RELATED ART

RELATED ART

POWER CONVERSION DEVICE, INCLUDING SERIAL SWITCHING ELEMENT, THAT COMPENSATES FOR VOLTAGE FLUCTUATIONS

CROSS-REFERENCE TO RELATED APPLICATION

This application is a continuation of International Application No. PCT/JP2012/002477, filed on Apr. 10, 2012. The disclosure of the PCT application in its entirety, including the drawings, claims, and the specification thereof, is incorporated herein by reference.

BACKGROUND

1. Field of the Invention

Embodiments of the invention relate to power conversion devices, and, in particular, power conversion devices that compensate for alternating current power source voltage fluctuations or power interruptions.

2. Related Art

FIG. 6 shows an alternating current step-up chopper circuit using semiconductor switching elements (hereafter called bidirectional switching elements) that compensates for an alternating current power source voltage drop, supplies a constant voltage to a load, and can control the turning on and off of a bidirectional current (see Japanese Patent No. 3,902,030 at FIG. 17).

The alternating current step-up chopper circuit is configured of a first series circuit wherein a first inductor 4 and first bidirectional switching element 6 are connected in series and a second series circuit, connected in parallel to the first bidirectional switching element 6, wherein a second bidirectional switching element 5 and capacitor 3 are connected in series.

By alternately turning the two bidirectional switching elements 5 and 6 on and off in the alternating current step-up chopper circuit, it is possible to maintain a load voltage Vout (the voltage across the capacitor 3) even when a voltage Vin of an alternating current power source 1 drops. The load voltage Vout is determined by the turn-on and turn-off ratios of the two bidirectional switching elements 5 and 6.

For example, when the power source voltage Vin drops to 80% of the rating, the step-up ratio for keeping the load voltage Vout at 100% of the rating is [1.0/0.8]. Therefore, the turn-on ratio of the bidirectional switching element 5 is [0.8], while the turn-on ratio of the bidirectional switching element 6 is [0.2 (=1−0.8)].

FIGS. 7A-7D show examples of configurations of bidirectional switching elements used in an alternating current step-up chopper. In FIG. 7A, two reverse blocking IGBTs, given a breakdown voltage with respect to voltage of reverse polarity equivalent to that with respect to forward polarity, are connected in anti-parallel. FIG. 7B shows circuits given reverse breakdown voltage by a diode being connected in series to a normal IGBT that does not have reverse breakdown voltage, the circuits being further connected in anti-parallel. FIG. 7C shows reverse conducting elements wherein diodes are connected in parallel to IGBTs, further connected in anti-series. FIG. 7D shows the same kind of connection as FIG. 7C, but MOSFETs are used as the switching elements.

Unlike an IGBT, a MOSFET has resistance characteristics such that current and forward voltage drop are proportional, meaning that, theoretically, the forward voltage drop can be brought ever nearer to zero by increasing the number of MOSFETs in parallel. Also, as a MOSFET also conducts in a reverse direction when voltage is applied to its gate, it is possible under certain conditions to reduce the forward voltage drop farther than with a parallel diode. In particular, as MOSFETs using SiC (silicon carbide) have started to be commercialized recently, a considerable reduction in forward voltage drop is expected.

However, the following two problems are known regarding the previously described alternating current step-up chopper circuit.

The first problem is that there is a limit to the amount of voltage compensation for the alternating current power source voltage drop. In a step-up operation, an input current Iin flowing is larger by an amount proportionate to the step-up of a load current Iout. For example, assuming that the power source voltage Vin drops to [⅕] of when it is rated, the input current Iin momentarily becomes five times the rating. Because of this, the semiconductor switching elements used as the bidirectional switching elements need to be able to tolerate five times the amount of current. Also, it is necessary that the inductor does not become saturated even when the previously described current flows. Because of this, the semiconductor switching elements and inductor increase in size as the voltage range to be compensated for widens, and the cost also increases. Because of this, in actual practice the power conversion device is used with 50% to 100% of the power source voltage as the compensation range, while 50% or less is taken to be outside the compensation range.

However, there is no guarantee that the amount of voltage drop when there is a momentary voltage drop is constant, and while it is preferable to increase the compensated voltage range in order to reduce the risk of failure in a load device, it is not possible to supply power to the load when there is a short power interruption such that the power source voltage drops to zero. Also, as a step-down operation is not possible, it is not possible to compensate for a voltage rise such that the power source voltage Vin becomes higher than the load voltage Vout. Furthermore, when the alternating current power source voltage and load voltage are asynchronous, such as when the power source frequency is abnormal, it is not possible to supply power to the load. Consequently, although the configuration of the alternating current step-up chopper circuit is simple, there is a problem with regard to the level of power source quality and reliability required by the load.

The second problem is that surge voltage is generated when the bidirectional switching elements are cut off, and in the worst case, the elements configuring the load and alternating current step-up chopper circuit are destroyed. As factors in surge voltage being generated, there is one caused when the current to the switching elements is interrupted during a normal working operation, and one caused by an operation turning off all the switching elements when protecting the device, with the latter constituting a particular problem. The former, as is commonly known, is such that a high dI/dt (dI is the amount of current change, while dt is time) occurs when turning off the switching elements, and a surge voltage of L×dI/dt (where L is wire inductance) is generated due to the wire inductance around the switching elements.

To give a description of the latter factor, when some accident such as, for example, a load short circuit occurs during a step-up operation, the bidirectional switching elements 5 and 6 have to be stopped in order to ensure safety. However, when simultaneously turning off the bidirectional switching elements 5 and 6 during a conversion operation, there is no longer a path for consuming energy stored in the inductor 4, meaning that surge voltage is generated in the bidirectional switching element 5 or 6. Regarding the wire inductance, a certain amount of improvement is possible by, for example, shortening the wires between the switching elements, or the like, but as the inductor 4 inductance of the latter factor is determined by circuit conditions, it is extremely large with respect to wire inductance (a few tens of a nanohenry to a few hundred nanohenry), and the surge voltage is also high.

The kind of power conversion device shown in, for example, Japanese patent publication no. JP-A-11-178216 is known as a method of solving the first problem. A configuration is shown in FIG. 8. By energy of capacitors 35 and 36 being supplied via a transformer 31 to a load 2 by an inverter 42 when a power source voltage Vin fluctuates within a constant range, voltage equivalent to the amount of fluctuation of the power source voltage Vin is compensated for, thereby keeping a load voltage Vout constant, and the energy of the capacitors 35 and 36 is replenished or returned by an inverter 43. Meanwhile, when the power source voltage Vin drops to a voltage outside the compensation range, the energy of the capacitors 35 and 36 is supplied to the load 2 by the inverter 43.

It is possible with this device to supply a constant voltage to the load over a wide range of fluctuation of the power source voltage Vin but, as the voltage compensating transformer 31 (such as, for example, an insulating transformer with a commercial frequency of 50 to 60 Hz) is necessary, there is a problem in terms of the capacity, weight, and cost of the device. Also, as power equivalent to the amount of voltage compensation passes through two inverters, another problem occurs in that power converter loss is greater than in the case of an alternating current step-up chopper.

The kind of rectifying snubber circuit shown in, for example, Japanese patent publication no. JP-A-2007-221844 is known as a method of solving the second problem. A matrix converter device 50 of Japanese patent publication no. JP-A-2007-221844 shown in FIG. 9 is configured of a matrix converter 46, an input filter 47, and a rectifier snubber circuit 48. The rectifier snubber circuit 48 is connected to the input side and output side of the matrix converter 46. The input filter 47 is configured of, for example, a inductor and a capacitor. FIG. 9 shows an example of application to a three-phase matrix converter, but the rectifier snubber circuit 48 also achieves the same advantage in a single-phase or three-phase alternating current step-up chopper.

In the case of turning off all of the switching elements when protecting the device, as previously described, surge voltage is generated by energy stored in the inductance on the power source side (herein, the components of the input filter 47) and the inductance on the load side (herein, the motor 49). The surge voltage generated is rectified by passing through a rectifier circuit 51 or 52, and a voltage rise on the power source side and load side is suppressed, and overvoltage prevented, by a capacitor 53 being charged. Also, when the amount of energy generated by the inductance components of the power source side and load side is large, and the direct current voltage of the capacitor 53 rises above a predetermined value, overvoltage is prevented by the energy being consumed in a discharge circuit 56. The operation is such that overvoltage is detected by a voltage detection circuit 57, and the energy is consumed in a resistor 55 by a semiconductor switching element 54 being turned on.

Thus, in the related art, it is possible to address the above-discussed problems by changing or adding circuits, but such solutions do not solve the heretofore described problems simultaneously, and such solutions also can introduce additional problems. Accordingly, as described above, there is a need in the art for an improved power conversion device.

SUMMARY OF THE INVENTION

Embodiments of the invention address these and other needs. Embodiments of the invention provide a power conversion device such that it is possible to supply a constant voltage to a load over a wide range of alternating current power source voltage fluctuation, and to suppress surge voltage of bidirectional switching elements, while avoiding an increase in size, an increase in cost, and a A power conversion device according to embodiments of the invention includes a first series circuit wherein a first inductor and a first bidirectional switching element are connected in series, a second series circuit, connected in parallel to the first bidirectional switching element, wherein a second bidirectional switching element and a capacitor are connected in series, a serial switching element wherein 2N (N being a positive integer) switching elements, in each of which a diode is connected in anti-parallel, are connected in series, a serial storage element, connected in parallel to the serial switching element, wherein first and second storage elements are connected in series, a first serial rectifier element, connected in parallel to the serial storage element, wherein first and second rectifier elements are connected in series, and a second inductor connected from an intermediate point of the 2N switching elements to a connection point of the second bidirectional switching element and capacitor, wherein a connection point of the first and second storage elements is connected to a connection point of the first bidirectional switching element and the capacitor, a connection point of the first and second rectifier elements is connected to a connection point of the first bidirectional switching element and second bidirectional switching element, and alternating current applied to the first series circuit is converted, and output from both ends of the capacitor.

According to embodiments of the heretofore described power conversion device, it is possible, by driving the first and second bidirectional switching elements and/or the 2N switching elements, to step-up or step-down the alternating current power source voltage, thereby keeping the voltage of the capacitor (across the load) constant.

Furthermore, by the energy stored in the first inductor being absorbed via the serial rectifier element by the serial storage element when the first and second bidirectional switching elements are cut off, it is possible to protect the bidirectional switching elements from surge voltage.

Also, the power conversion device of embodiments of the invention is such that it is possible to avoid an increase in size and an increase in cost of the device.

The power conversion device according to embodiments of the invention is characterized by further including a second serial rectifier element, connected in parallel to the first rectifier element, wherein third and fourth rectifier elements are connected in series, wherein a connection point of the third and fourth rectifier elements is connected to a connection point of the second bidirectional switching element and capacitor.

According to the heretofore described power conversion device of embodiments of the invention, energy stored in the inductance component on the load side can be swiftly absorbed, and it is thus possible to more reliably suppress the surge voltage of the bidirectional switching elements.

The power conversion device according to embodiments of the invention is characterized by including a voltage detection means that detects the voltage value of the alternating current, and a drive control unit that drives each of the first and second bidirectional switching elements and first and second switching elements, the drive control unit including a first mode that, when the alternating current voltage value detected by the voltage detection means is within a predetermined first voltage range, turns off the first bidirectional switching element, turns on the second bidirectional switching element, and drives the 2N switching elements to step-up the alternating current, thereby maintaining the voltage of the serial storage element at a predetermined voltage value, a second mode that, when the alternating current voltage value is within a predetermined second voltage range lower than the first voltage range, drives the first and second bidirectional switching elements to step-up the alternating current and apply it to the capacitor, thereby maintaining the voltage of the capacitor at the predetermined voltage value, and drives the 2N switching elements to step-up the alternating current, thereby maintaining the voltage of the serial storage element at the predetermined voltage value, a third mode that, when the alternating current voltage value is lower than the second voltage range, turns off the first and second bidirectional switching elements, and drives the 2N switching elements, thereby maintaining the voltage of the capacitor at the predetermined voltage value using power stored in the serial storage element, and a fourth mode that, when the alternating current voltage value is higher than the first voltage range, turns off the first bidirectional switching element and drives the second bidirectional switching element to step-down the alternating current, thereby maintaining the voltage of the capacitor at the predetermined voltage value, and drives the 2N switching elements to step-up the alternating current, thereby maintaining the voltage of the serial storage element at the predetermined voltage value.

According to embodiments of the heretofore described power conversion device, it is possible to step-up or step-down the alternating current power source voltage over a wide range of alternating current power source voltage fluctuation, thereby keeping the voltage of the capacitor (across the load) constant.

Also, as each mode causes power to pass through the minimum necessary number of bidirectional switching elements and semiconductor switching elements, a reduction of efficiency can be avoided.

The power conversion device according to embodiments of the invention is characterized in that the drive control unit includes a fifth mode that, when the alternating current voltage value is within a predetermined third voltage range lower than the second voltage range, and a time is within a predetermined time, turns off the second bidirectional switching element and drives the first bidirectional switching element to step-up the alternating current, thereby maintaining the voltage of the serial storage element at the predetermined voltage value, and drives the 2N switching elements, thereby maintaining the voltage of the capacitor at the predetermined voltage value using power stored in the serial storage element.

According to embodiments of the heretofore described power conversion device, it is possible to keep the voltage of the capacitor (across the load) constant even when a momentary voltage drop occurs in the alternating current power source.

Also, the power conversion device of embodiments of the invention is such that, as a large current flows for an extremely short period, it is possible to avoid an increase in size and an increase in cost of the inductors.

The power conversion device according to embodiments of the invention is characterized in that the drive control unit includes a sixth mode that, when the alternating current voltage value is within the third voltage range, a time is within a predetermined time, and the voltage phase of the alternating current is synchronous with the voltage phase of the capacitor, drives the first and second bidirectional switching elements to step-up the alternating current, and drives the 2N switching elements, thereby maintaining the voltage of the capacitor at the predetermined voltage value using power stored in the serial storage element.

According to embodiments of the heretofore described power conversion device, even in the event that the storage elements are of small capacity, it is possible to compensate for a lack of power stored in the storage elements by driving the first and second bidirectional switching elements, thereby supplying power from the alternating current. Therefore, the sixth mode can compensate for a momentary voltage drop more reliably than the fifth mode. Alternatively, it is possible to reduce the size of the 2N switching elements and the serial storage element.

The power conversion device according to embodiments of the invention is characterized by further including a frequency detection means that detects the frequency of the alternating current, the drive control unit including a seventh mode that, when the alternating current voltage value is within, or higher than, the second voltage range and the frequency detection means detects that the voltage value is deviating from a predetermined frequency range, turns off the second bidirectional switching element and drives the first bidirectional switching element to step-up or step-down the alternating current, thereby maintaining the voltage of the serial storage element at the predetermined voltage value, and drives the 2N switching elements, thereby maintaining the voltage of the capacitor at the predetermined voltage value using power stored in the serial storage element.

According to embodiments of the heretofore described power conversion device, it is possible to keep the voltage of the capacitor (across the load) constant even when the alternating current power source frequency is abnormal.

The power conversion device according to embodiments of the invention is characterized by further including a third bidirectional switching element connected from a connection point of the 2N switching elements to a connection point of the first and second storage elements.

According to embodiments of the heretofore described power conversion device, it is possible to obtain three levels of voltage output to the capacitor by replacing the operation of driving the 2N switching elements in the first to seventh modes with an operation of driving so as to turn on any one of an upper arm side switching element or lower arm side switching element of the 2N switching elements or the third bidirectional switching element. Consequently, the power conversion device of the invention is such that, as the amplitude value of the voltage applied to the semiconductor switching elements decreases, it is possible to increase efficiency owing to a reduction in switching loss. Also, as the dI/dt of the current flowing through the second inductor is reduced, it is possible to reduce the size of the second inductor.

Advantageous Effects of Invention

According to the power conversion device of embodiments of the invention, a superior advantage is achieved in that there is a balance between supplying a constant voltage to a load over a wide range of alternating current power source voltage fluctuation and suppressing surge voltage of bidirectional switching elements, without an increase in size, an increase in cost, or a reduction of efficiency of the device.

DETAILED DESCRIPTION

Hereafter, referring to the attached drawings, a description will be given of embodiments of the invention.

Example 1

Figure 1:
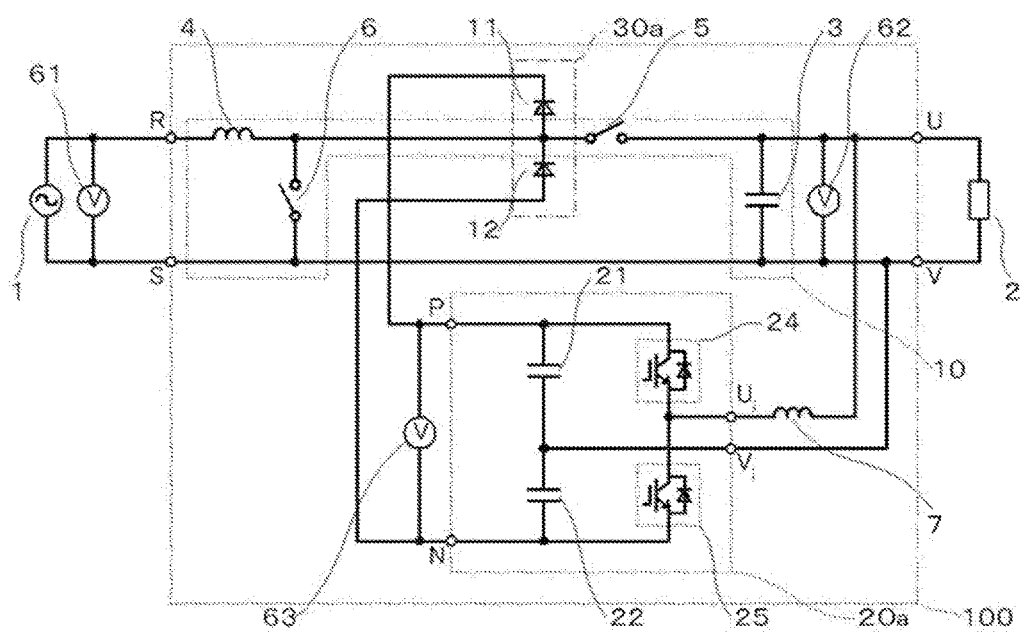
FIG. 1A is a diagram showing a main circuit of first to third embodiments of the invention.
FIG. 1B is a diagram showing a drive control unit of the first to third embodiments of the invention.
Figure 1:
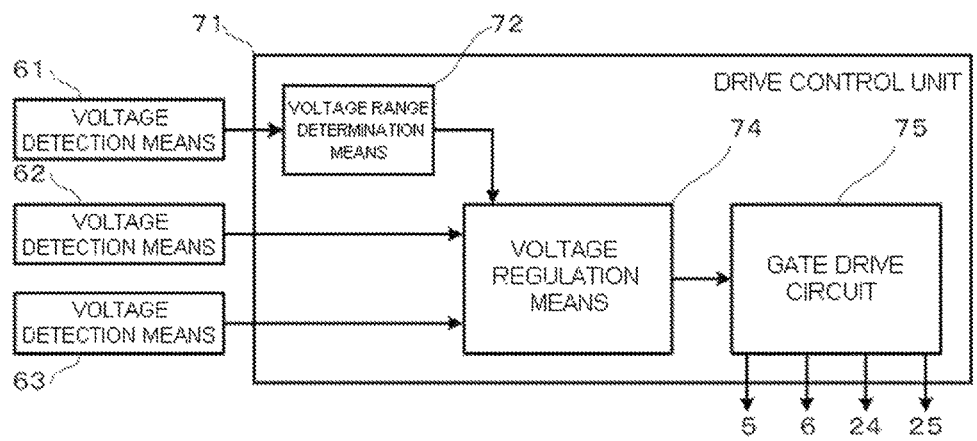
Figure 6:
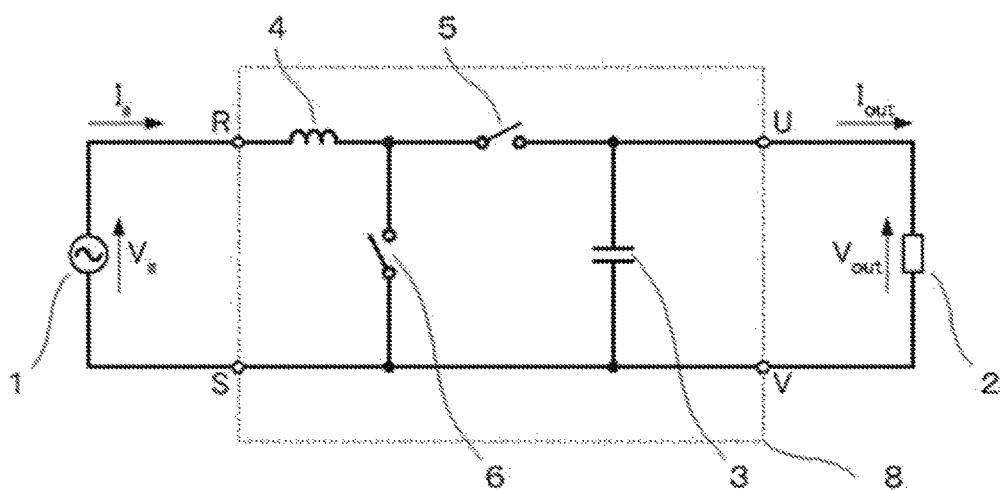
FIG. 6 is a circuit diagram showing an embodiment of heretofore known technology 1.
Figure 7:
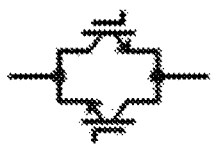
FIG. 7A is a circuit diagram showing a first configuration example of a bidirectional switching element of the heretofore known technology 1.
FIG. 7B is a circuit diagram showing a second configuration example of the bidirectional switching element of the heretofore known technology 1.
FIG. 7C is a circuit diagram showing a third configuration example of the bidirectional switching element of the heretofore known technology 1.
FIG. 7D is a circuit diagram showing a fourth configuration example of the bidirectional switching element of the heretofore known technology 1.
Figure 7:
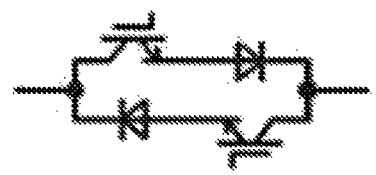
Figure 7:
Figure 7:
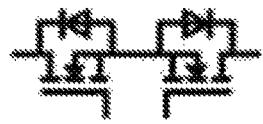
Figure 8:
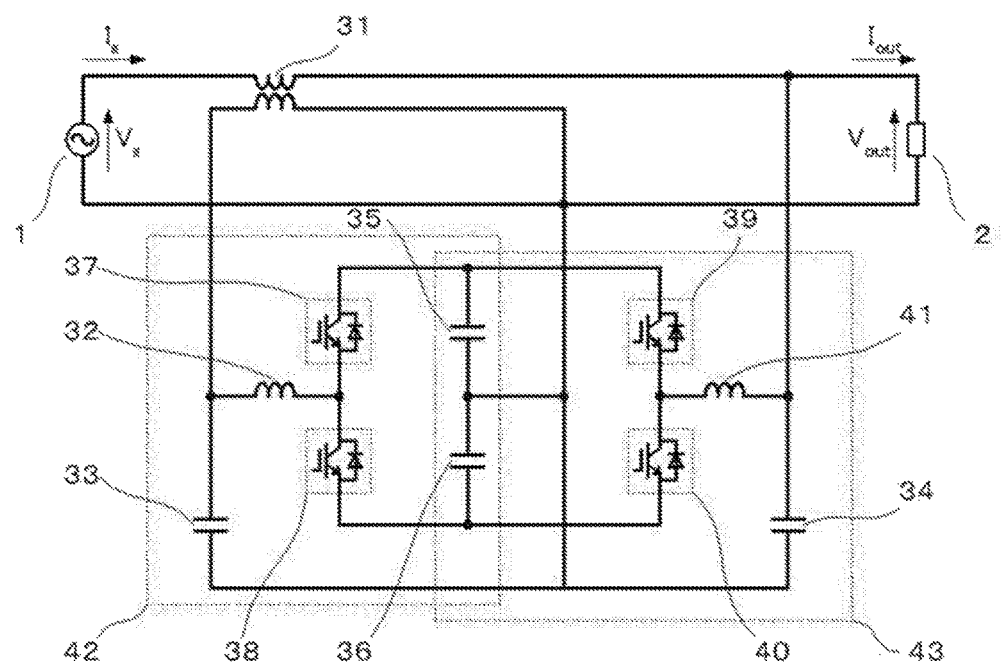
FIG. 8 is a circuit diagram showing an embodiment of heretofore known technology 2.
Figure 9:
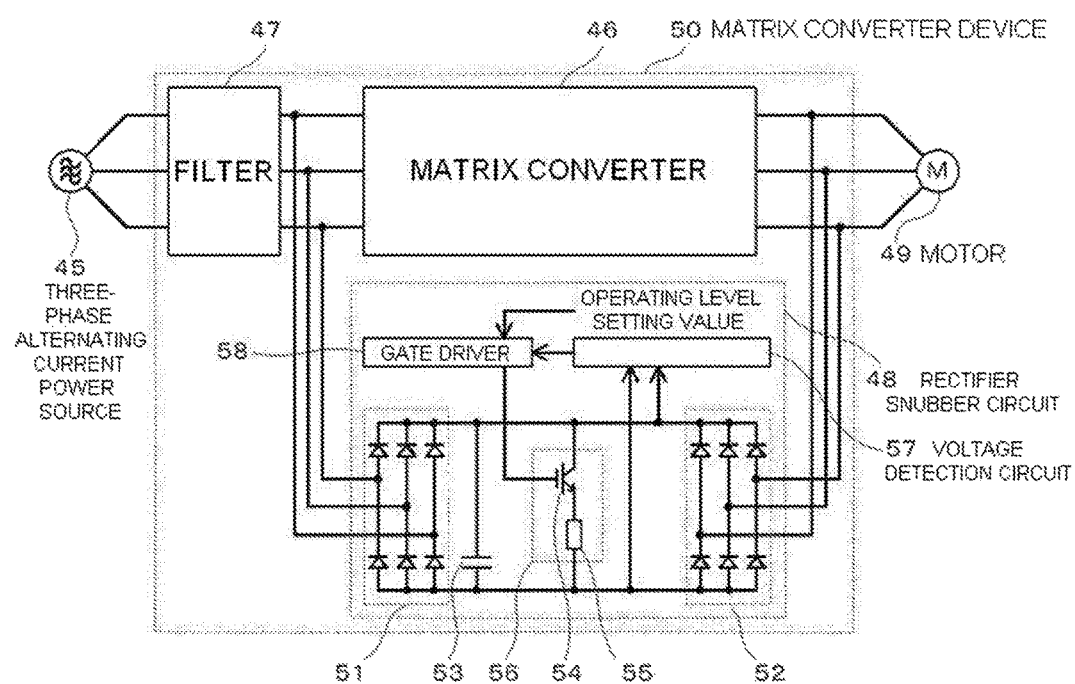
FIG. 9 is a circuit diagram showing an embodiment of heretofore known technology 3.

FIG. 1A shows a power conversion device according to Example 1 of the invention, wherein portions given the same reference signs as in FIG. 6 indicate the same things, and the basic configuration is the same as a heretofore known configuration shown in FIG. 6. Also, FIG. 1B shows a drive control unit that generates a control signal for operating the power conversion device according to Example 1 of the invention.

Next, a description will be given of a circuit configuration of Example 1.

The power conversion device according to Example 1 of the invention is configured of a step-up/step-down chopper unit 10, an inverter unit 20a, a rectifier unit 30a, a first to a third voltage detection means 61 to 63, and a drive control unit 71.

The step-up/step-down chopper unit 10 includes a first series circuit wherein a first inductor 4 and first bidirectional switching element 6 are connected in series. The step-up/step-down chopper unit 10 is configured of a second series circuit, connected in parallel to the first bidirectional switching element 6, wherein a second bidirectional switching element 5 and first capacitor 3 are connected in series.

The inverter unit 20a includes a serial switching element wherein first and second semiconductor switching elements 24 and 25, in each of which a diode is connected in anti-parallel, are connected in series. The inverter unit 20a includes a serial storage element, connected in parallel to the serial semiconductor switching elements 24 and 25, wherein first and second storage elements 21 and 22 are connected in series. Also, the inverter unit 20a includes a second inductor 7 connected from an intermediate point of the semiconductor switching elements 24 and 25 to a connection point of the second bidirectional switching element 5 and first capacitor 3. Further, the inverter unit 20a is configured so that a connection point of the storage elements 21 and 22 is connected to a connection point of the first bidirectional switching element 6 and capacitor 3.

The rectifier unit 30a is configured of a first serial rectifier element wherein first and second rectifier elements 11 and 12 are connected in series. A connection point of the first serial rectifier elements 11 and 12 is connected to a connection point of the bidirectional switching element 6 and bidirectional switching element 5. Also, the first serial rectifier elements 11 and 12 are connected in parallel to the serial storage elements 21 and 22, configuring a snubber circuit.

A detector terminal of the first voltage detection means 61 is connected to either end of an alternating current power source 1. A detector terminal of the second voltage detection means 62 is connected to either end of the capacitor 3. A detector terminal of the third voltage detection means 63 is connected to either end of the serial storage elements 21 and 22.

The drive control unit 71 includes a voltage range determination means 72, a voltage regulation means 74, and a gate drive circuit 75.

An output terminal of the first voltage detection means 61 is connected to the voltage range determination means 72. Output terminals of the second voltage detection means 62 and the third voltage detection means 63 are connected to the voltage regulation means 74. An output terminal of the voltage range determination means 72 is connected to the voltage regulation means 74. An output terminal of the voltage regulation means 74 is connected to the gate drive circuit 75. A plurality of output terminals of the gate drive circuit 75 are connected one to each of the switching elements 5, 6, 24, and 25.

Next, an outline description will be given of an operation of the power conversion device according to Example 1.

Control signals for maintaining the voltage of the capacitor 3 at a predetermined effective voltage value are generated in the drive control unit 71. Hereafter, a description will be given of a case of maintaining the voltage of the capacitor 3 at the predetermined effective voltage value, but a voltage value used as a target value is not limited to the effective voltage value. A description will be given hereafter of means of generating the control signals in the drive control unit 71.

Each of the switching elements 5, 6, 24, and 25 is driven by a control signal generated in the drive control unit 71 being input into a control terminal. By each of the switching elements 5, 6, 24, and 25 being driven, at least one of energy stored in the inductor 4 and that stored in the first and second storage elements 21 and 22 is supplied to the capacitor 3. Because of this, the voltage of the capacitor 3 is maintained at the predetermined effective voltage value.

Continuing, a detailed description will be given of an operation of the drive control unit 71. The voltage range determination means 72 of the drive control unit 71 determines in what voltage range the effective voltage value of the alternating current power source 1 detected by the voltage detection means 61 lies. One operating mode is selected from among a plurality of operating modes in accordance with the result of the determination by the voltage range determination means 72. Hereafter, a threshold value used in the determination of the voltage range by the voltage range determination means 72 and a voltage value detected by the voltage detection means 61 will be described in relation to when using the effective voltage value, but they are not limited by the effective voltage value. A detailed description of each operating mode will be given hereafter.

Two sets of control signals—control signals for the bidirectional switching elements 5 and 6 and control signals for the semiconductor switching elements 24 and 25—are generated in the voltage regulation means 74. The two sets of control signals are generated by a first or second function, to be described hereafter. Also, the control signals for the bidirectional switching elements 5 and 6 are such that a third function is further added in accordance with the operating mode.

The first function is such as to generate control signals for maintaining the voltage of the capacitor 3 detected by the voltage detection means 62 at the predetermined effective voltage value. The second function is such as to generate control signals for maintaining the voltage across the storage elements 21 and 22 detected by the voltage detection means 63 at the predetermined effective voltage value. The third function is such as to substitute the control signals generated by the first and second functions with control signals generated to keep at least one switching element of the bidirectional switching elements 5 and 6 in a constant on-state or constant off-state.

The gate drive circuit 75 converts the two sets of control signals generated in the voltage regulation means 74 into signals for driving each of the switching elements 5, 6, 24, and 25, and outputs the signals to the control terminals.

The drive control unit shown in FIG. 1B, as heretofore described, is one example of logic for selecting an operating mode, and generating and outputting switching element control signals. Consequently, provided that the advantage according to the invention can be produced, the block diagram shown in FIG. 1B is not limiting.

Next, a description will be given of operating modes of Example 1.

(Operating Mode 1)

Operating Mode 1 is selected when it is determined by the voltage range determination means 72 that the effective voltage value of the alternating current power source 1 detected by the first voltage detection means 61 is within a predetermined first voltage range. Herein, the first voltage range is assumed to be, for example, 90% to 110% of an effective rated voltage value.

In the step-up/step-down chopper unit 10, the bidirectional switching element 6 is turned off and the bidirectional switching element 5 turned on by the control signals generated with the third function added to the first function. Because of this, the voltage of the alternating current power source 1 is applied directly to the capacitor 3.

By the semiconductor switching elements 24 and 25 being exclusively turned on and off in the inverter unit 20$a$ by the control signals generated by the second function, the voltage of the capacitor 3 is stepped-up, and supplied to the storage elements 21 and 22. In this way, using the energy of the capacitor 3, the drive control unit 71 maintains the voltage across the storage elements 21 and 22 at the predetermined effective voltage value.

(Operating Mode 2)

Operating Mode 2 is selected when it is determined by the voltage range determination means 72 that the effective voltage value of the alternating current power source 1 detected by the first voltage detection means 61 is within a predetermined second voltage range lower than the first voltage range. Herein, the second voltage range is assumed to be, for example, 50% to 90% of the effective rated voltage value.

In the step-up/step-down chopper unit 10, the voltage of the alternating current power source 1 is stepped-up, and supplied to the capacitor 3, by the bidirectional switching elements 5 and 6 being exclusively turned on and off by the control signals generated by the first function. In this way, using the energy of the alternating current power source 1, the drive control unit 71 maintains the voltage of the capacitor 3 at the predetermined effective voltage value.

By the semiconductor switching elements 24 and 25 being exclusively turned on and off in the inverter unit 20$a$ by the control signals generated by the second function, the voltage of the capacitor 3 is stepped-up, and supplied to the storage elements 21 and 22. In this way, using the energy of the capacitor 3, the drive control unit 71 maintains the voltage across the storage elements 21 and 22 at the predetermined effective voltage value.

(Operating Mode 3)

Operating Mode 3 is selected when it is determined by the voltage range determination means 72 that the effective voltage value of the alternating current power source 1 detected by the first voltage detection means 61 is lower than the second voltage range. Herein, a voltage range lower than the second voltage range is assumed to be, for example, 0% to 50% of the effective rated voltage value.

The bidirectional switching elements 5 and 6 are turned off in the step-up/step-down chopper unit 10 by the control signals generated with the third function added to the first function. Because of this, the capacitor 3 is in a condition wherein it is disconnected from the alternating current power source 1.

By the semiconductor switching elements 24 and 25 being exclusively turned on and off in the inverter unit 20$a$ by the control signals generated by the first function, the energy of the storage elements 21 and 22 is supplied to the capacitor 3. In this way, using the energy of the storage elements 21 and 22, the drive control unit 71 maintains the voltage of the capacitor 3 at the predetermined effective voltage value.

(Operating Mode 4)

Operating Mode 4 is selected when it is determined by the voltage range determination means 72 that the effective voltage value of the alternating current power source 1 detected by the first voltage detection means 61 is higher than the predetermined first voltage range. Herein, a voltage range higher than the predetermined first voltage range is assumed to be, for example, higher than 110% of the effective rated voltage value.

By the bidirectional switching element 6 being turned off and the bidirectional switching element 5 being turned on and off by the control signals generated with the third function added to the first function in the step-up/step-down chopper unit 10, the voltage of the alternating current power source 1 is stepped-down, and supplied to the capacitor 3. In this way, using the energy of the alternating current power source 1, the drive control unit 71 maintains the voltage of the capacitor 3 at the predetermined effective voltage value.

By the semiconductor switching elements 24 and 25 being exclusively turned on and off in the inverter unit 20a by the control signals generated by the second function, the voltage of the capacitor 3 is stepped-up, and supplied to the storage elements 21 and 22. In this way, using the energy of the capacitor 3, the drive control unit 71 maintains the voltage across the storage elements 21 and 22 at the predetermined effective voltage value.

Next, a description will be given of some advantages of Example 1.

In a majority of load devices, a certain amount, for example ±10%, of fluctuation in an input power source effective voltage value is tolerated. At this time, the power conversion device of the invention is such that, as the voltage of the alternating current power source 1 is applied to the capacitor 3 by the bidirectional switching element 5 being turned on and the bidirectional switching element 6 being turned off, absolutely no switching loss occurs.

At the same time, the power conversion device of the invention is such that, in preparation for an operation when compensating the voltage, the drive control unit 71 maintains the voltage of the storage elements 21 and 22 at the predetermined effective voltage value by driving the semiconductor switching elements 24 and 25. Once the storage elements 21 and 22 are charged, it is sufficient to supply energy equivalent to leakage current. Therefore, passing current of the semiconductor switching elements 24 and 25 is extremely small, and loss thereof is of an extent that can be ignored.

The power conversion device of embodiments of the invention is such that terminals S and V and a terminal Vi of the inverter unit 20a are of the same potential. That is, the potential of the alternating current power source 1 is fixed with respect to the potential of a neutral point of the storage elements 21 and 22. Consequently, the rectifier elements 11 and 12 and storage elements 21 and 22 operate as a snubber circuit (a so-called clamp snubber circuit) of the bidirectional switching elements 5 and 6. Therefore, the power conversion device of the invention is such that, as the energy when the bidirectional switching elements 5 and 6 are cut off, or the energy of the inductors when all the bidirectional switching elements are in an off-state, can be absorbed, it is possible to suppress surge voltage.

The power conversion device of embodiments of the invention is such that, when carrying out a stepping-down operation, the bidirectional switching element 6 is constantly in an off-state, and a chopper operation is carried out on a power source voltage Vin by the bidirectional switching element 5. Also, when the bidirectional switching element 5 is in an off-state, energy stored in the inductor 4 is returned to the power source via the inverter unit 20a. As the power passing through the inverter at this time is equivalent to the amount of voltage compensation, it is possible to reduce loss.

Example 2

As the configuration of the power conversion device according to Example 2 is the same as that in Example 1, a description will be omitted.

Operations of the power conversion device according to Example 2 include Operating Modes 1 to 4 of Example 1, and can further include Operating Mode 5.

(Operating Mode 5)

Operating mode 5 is selected when the following two conditions are satisfied. The first condition is that it is determined by the voltage range determination means 72 that the effective voltage value of the alternating current power source 1 detected by the voltage detection means 61 is within a predetermined third voltage range lower than the second voltage range. Herein, the predetermined third voltage range lower than the second voltage range is assumed to be, for example, 10% to 50% of the effective rated voltage value. The second condition is that the voltage drop of the alternating current power source 1 is within a predetermined time. Herein, the predetermined time is assumed to be, for example, several tens of milliseconds to one second. In Example 2, when the effective voltage value of the alternating current power source 1 detected by the voltage detection means 61 is in the following two states, Operating Mode 3 is selected, as previously described.

State 1: the effective voltage value is within the third voltage range, but the predetermined time is exceeded.

State 2: the effective voltage value is lower than the third voltage range.

By the bidirectional switching element 5 being turned off and the bidirectional switching element 6 being turned on and off by the control signals generated with the third function added to the second function in the step-up/step-down chopper unit 10, the voltage of the alternating current power source 1 is stepped-up, and supplied to the storage elements 21 and 22. In this way, using the energy of the alternating current power source 1, the drive control unit 71 maintains the voltage of the storage elements 21 and 22 at the predetermined effective voltage value.

By the semiconductor switching elements 24 and 25 being exclusively turned on and off in the inverter unit 20a by the control signals generated by the first function, the voltage of the storage elements 21 and 22 is stepped-up, and supplied to the capacitor 3. In this way, using the energy of the storage elements 21 and 22, the drive control unit 71 maintains the voltage of the capacitor 3 at the predetermined effective voltage value.

In Example 2, a so-called double conversion operation, whereby alternating current is converted to direct current in the rectifier unit 30a and direct current is converted to alternating current in the inverter unit 20a, is carried out in the power conversion device shown in FIGS. 1A and 1B. The double conversion operation is such that, as all power passes through two converters (the rectifier unit 30a and inverter unit 20a), loss increases in comparison with when carrying out an alternating current step-up chopper operation. However, the momentary voltage drop envisaged in Example 2 is normally a short time of several tens of milliseconds to one second. Therefore, the increase in loss due to the double conversion operation does not constitute a problem.

Also, the thermal time constant of the switching elements and inductors is greater than the envisaged momentary voltage drop time. Therefore, there is no danger of the inductor 4 or bidirectional switching element 6 breaking. By adopting the storage elements 21 and 22 as a battery, it is also possible to use this device as an uninterruptible power source device.

Example 3

As the configuration of the power conversion device according to Example 3 is the same as that in Example 1, a description will be omitted.

Operations of the power conversion device according to Example 3 include Operating Modes 1 to 4 of Example 1, and further include Operating Mode 6. The power conversion device according to Example 3 may also further include Operating Mode 5.

(Operating Mode 6)

Operating mode 6 is selected when the following three conditions are satisfied. The first condition is that it is determined by the voltage range determination means 72 that the effective voltage value of the alternating current power source 1 detected by the voltage detection means 61 is within the third voltage range. The second condition is that the voltage drop of the alternating current power source 1 is within the predetermined time. The third condition is that the voltage phase of the alternating current power source 1 detected by the first voltage detection means 61 is synchronous with the voltage phase of the capacitor 3. As a synchronization detection means is heretofore known technology, a description will be omitted. In Example 3, when the effective voltage value of the alternating current power source 1 detected by the first voltage detection means 61 is in the following three states, Operating Mode 3 is selected, as previously described. Also, in the case of State 3 alone, Operating Mode 5 may be selected.

State 1: the effective voltage value is within the third voltage range, but the predetermined time is exceeded.

State 2: the effective voltage value is lower than the third voltage range.

State 3: the effective voltage value is not synchronous with the voltage phase of the capacitor 3.

By the bidirectional switching elements 5 and 6 being exclusively turned on and off in the step-up/step-down chopper unit 10 by the control signals generated by the first function, the voltage of the alternating current power source 1 is stepped-up, and supplied to the capacitor 3. In this way, the step-up/step-down chopper unit 10 supplies power from the alternating current power source 1 to the capacitor 3.

By the semiconductor switching elements 24 and 25 being exclusively turned on and off in the inverter unit 20a by the control signals generated by the first function, the energy of the storage elements 21 and 22 is supplied to the capacitor 3. In this way, the inverter unit 20a supplies power from the storage elements 21 and 22 to the capacitor 3.

In Example 3, the step-up/step-down chopper unit 10 and inverter unit 20a divide the supplied power, and maintain the voltage of the capacitor 3 at the predetermined effective voltage value.

Even when the storage elements 21 and 22 are of small capacity, it is possible to compensate for a lack of power stored in the storage elements by causing the step-up/step-down chopper unit 10 to operate simultaneously, thus supplying power from the alternating current power source 1. Therefore, Operating Mode 6 can compensate for a momentary voltage drop more reliably than Operating Mode 5. Also, the capacity of the storage elements 21 and 22 can be reduced, although only when omitting the function of compensating for a complete power interruption (Operating Mode 3). That is, it is possible to reduce the size and reduce the cost of the power conversion device. Furthermore, there is also an advantage in that it is possible to reduce the size of the semiconductor switching elements 24 and 25.

Example 4

Figure 2:
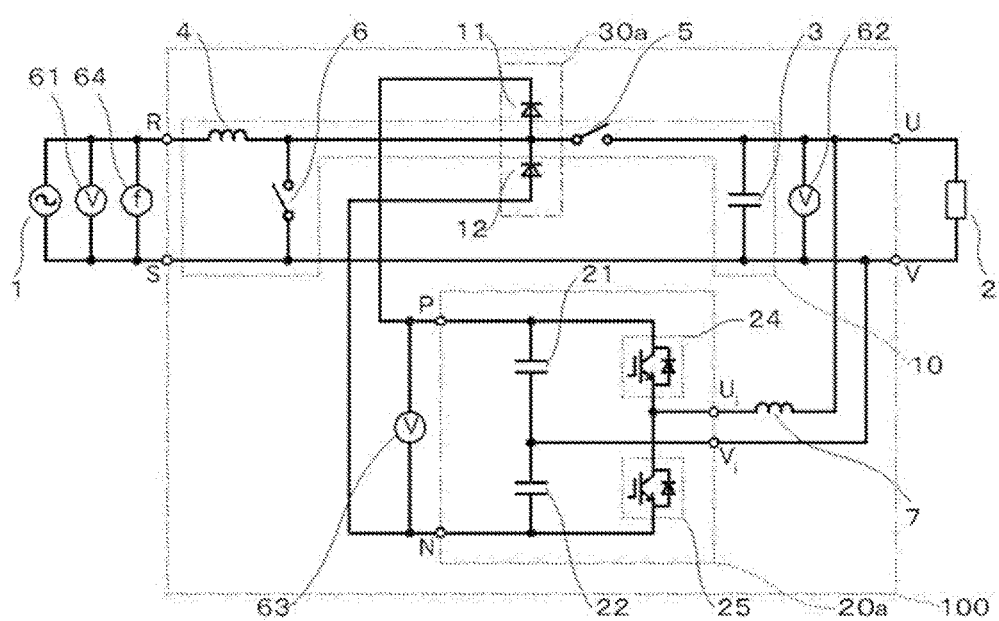
FIG. 2A is a diagram showing a main circuit of a fourth embodiment of the invention.
FIG. 2B is a diagram showing a drive control unit of the fourth embodiment of the invention.
Figure 2:
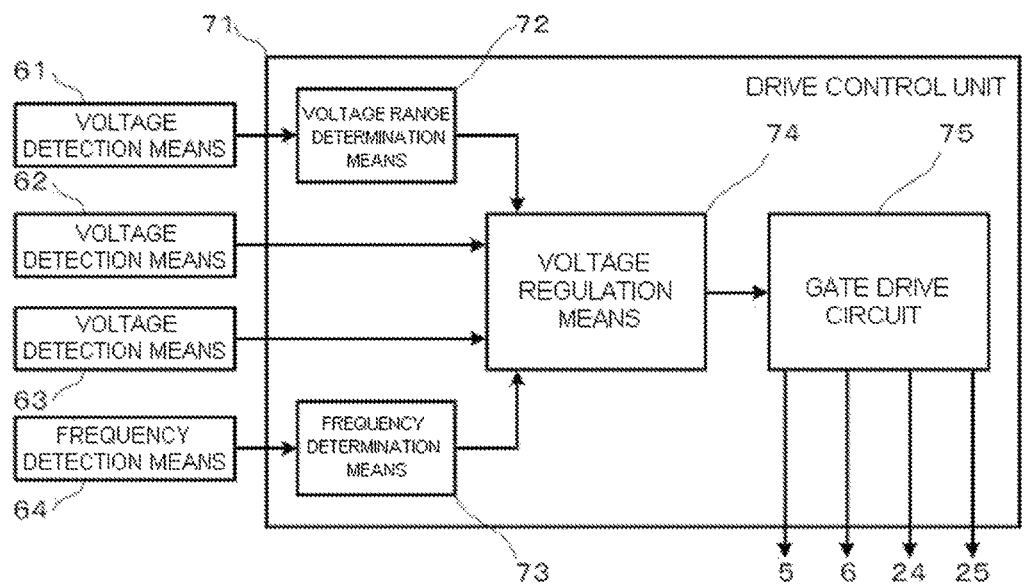

FIGS. 2A and 2B show the power conversion device according to Example 4 of the invention.

The basic configuration of the power conversion device according to Example 4 is the same as that in Example 1. In Example 4, a frequency detection means 64 and a frequency determination means 73 are included in addition to the configuration of Example 1.

A detection terminal of the frequency detection means 64 is connected to either end of the alternating current power source 1. The frequency determination means 73 is provided in the drive control unit 71. An output terminal of the frequency detection means 64 is connected to the frequency determination means 73, and an output terminal of the frequency determination means 73 is connected to the voltage regulation means 74.

Operations of the power conversion device according to Example 4 include Operating Modes 1 to 4 of Example 1, and further include Operating Mode 7. The power conversion device according to Example 4 may also further include Operating Modes 5 and 6.

(Operating Mode 7)

Operating mode 7 is selected when the following two conditions are satisfied. The first condition is that it is determined by the voltage range determination means 72 that the effective voltage value of the alternating current power source 1 detected by the first voltage detection means 61 is within, or higher than, the predetermined second voltage range. The second condition is that it is determined by the frequency determination means 73 that the voltage of the alternating current power source 1 detected by the frequency detection means 64 is deviating from a predetermined frequency range. Herein, the voltage range within, or higher than, the second voltage range is assumed to be, for example, 50% or more of the effective rated voltage value. Also, the predetermined frequency range is assumed to be, for example, ±0.2 Hz of a rated frequency. When it is determined by the frequency determination means 73 that the voltage is deviating from the predetermined frequency range, Operating Mode 7 is selected in preference to the selection of an operating mode by the voltage range determination means 72. Furthermore, when the voltage of the alternating current power source 1 detected by the frequency detection means 64 is in a state such that it is deviating from the predetermined frequency range, and the effective voltage value of the alternating current power source 1 detected by the first voltage detection means 61 is lower than the second voltage range, Operating Mode 3 is selected, as previously described.

By the bidirectional switching element 5 being turned off and the bidirectional switching element 6 being turned on and off by the control signals generated with the third function added to the second function in the step-up/step-down chopper unit 10, the voltage of the alternating current power source 1 is stepped-up, and supplied to the storage elements 21 and 22. In this way, using the energy of the alternating current power source 1, the drive control unit 71 maintains the voltage of the storage elements 21 and 22 at the predetermined effective voltage value.

By the semiconductor switching elements 24 and 25 being exclusively turned on and off in the inverter unit 20a by the control signals generated by the first function, the voltage of the storage elements 21 and 22 is stepped-up, and supplied to the capacitor 3. In this way, using the energy of the storage elements 21 and 22, the drive control unit 71 maintains the voltage of the capacitor 3 at the predetermined effective voltage value.

In Example 4, in the same way as in Example 3, a double conversion operation is carried out. The double conversion operation is such that it is possible for the load voltage to be constant, even in the event that the alternating current power source voltage and load voltage are asynchronous, such as when, for example, the power source frequency is abnormal. Also, as the power conversion device of Example 4 is such that it is a short time (0 to a few seconds) until the alternating current power source 1 voltage phase and load voltage phase become synchronized again, the loss thereof does not constitute a problem.

Example 5

Figure 3:
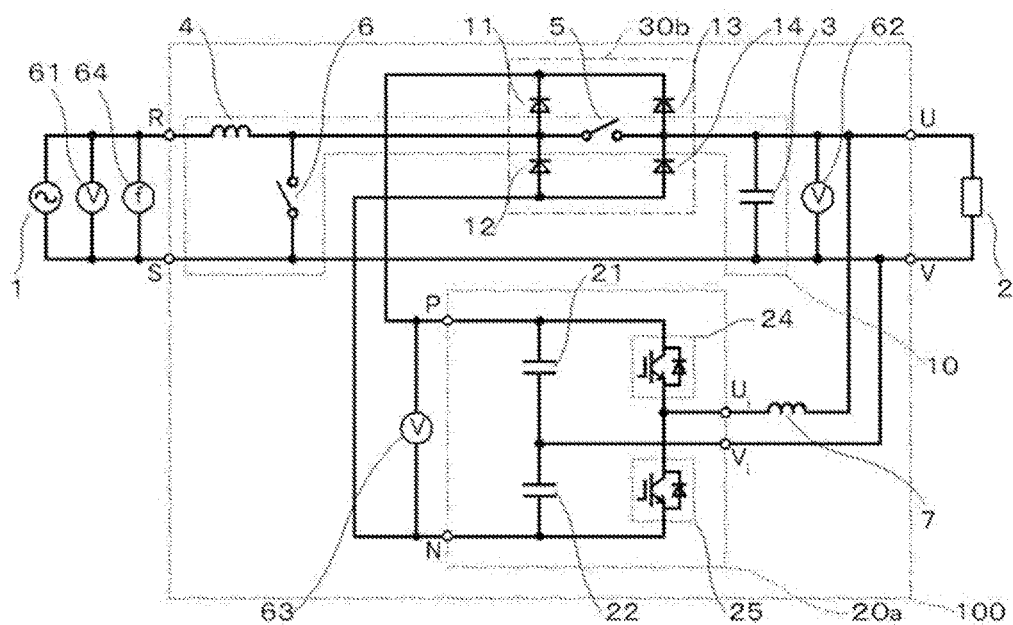
FIG. 3 is a circuit diagram showing a fifth embodiment of the invention.

FIG. 3 shows the power conversion device according to Example 5 of the invention. The drive control unit 71 corresponds to a main circuit, which is different from Example 1, but a drawing thereof is omitted.

While the basic configuration of the power conversion device according to Example 5 is the same as that in Example 1, the rectifier unit 30*a* is substituted with a rectifier unit 30*b*.

The rectifier unit 30*b* is configured of a second serial rectifier element, connected in parallel to the first serial rectifier element, wherein third and fourth rectifier elements 13 and 14 are connected in series. A connection point of the third and fourth rectifier elements 13 and 14 is connected to a connection point of the bidirectional switching element 5 and capacitor 3. Also, the second serial rectifier element configures a snubber circuit by being connected in parallel to the serial storage element.

Operations of the power conversion device according to Example 5 are the same as Operating Modes 1 to 7 of Examples 1 to 4.

Example 5 is such that, in the event that all of the semiconductor switching elements 5, 6, 24, and 25 are turned off, such as when an accident occurs, energy stored in the load inductance component is absorbed by the snubber circuit. As this energy absorbing operation is swifter than an operation by the parasitic diodes of the semiconductor switching elements 24 and 25 using the inductor 7, it is possible to more reliably suppress surge voltage.

Example 6

Figure 4:
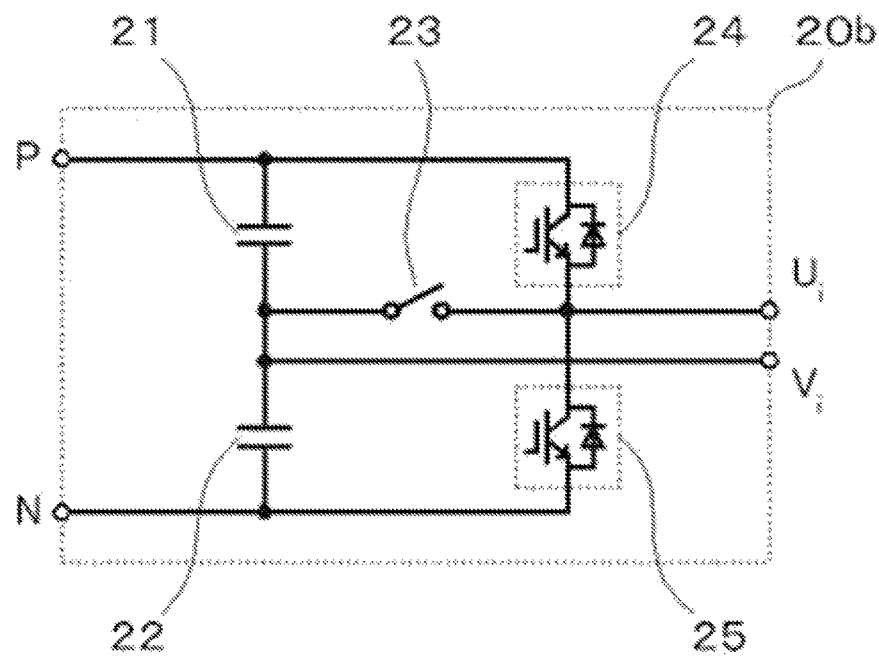
FIG. 4 is a circuit diagram showing a sixth embodiment of the invention.

FIG. 4 shows the power conversion device according to Example 6 of the invention. The drive control unit 71 corresponds to a main circuit, which is different from Example 1, but a drawing thereof is omitted.

While the basic configuration of the power conversion device according to Example 6 is the same as that in Example 5, the inverter unit 20*a* is substituted with an inverter unit 20*b*.

The inverter unit 20*b* includes a third bidirectional switching element 23 in addition to the inverter unit 20*a*. The bidirectional switching element 23 is connected to a connection point of the storage elements 21 and 22 and a connection point of the semiconductor switching elements 24 and 25, configuring a three-level inverter. The configuration of the inverter unit 20*b* is not limited to this, as it is sufficient that the alternating current potential is fixed with respect to the direct current potential, as previously described.

Basic operations of the power conversion device according to Example 6 are the same as Operating Modes 1 to 7 of Examples 1 to 4. A difference from the operations of Example 1 is that the inverter unit 20*b* operates as a commonly known three-level inverter.

As Example 6 is such that the inverter unit 20*b* is configured of a three-level inverter, and the voltage amplitude value and voltage applied to the inductor 7 when switching are halved, it is possible to reduce loss in the semiconductor switching elements 24 and 25 and to reduce the size of the inductor 7.

Example 7

Figure 5:
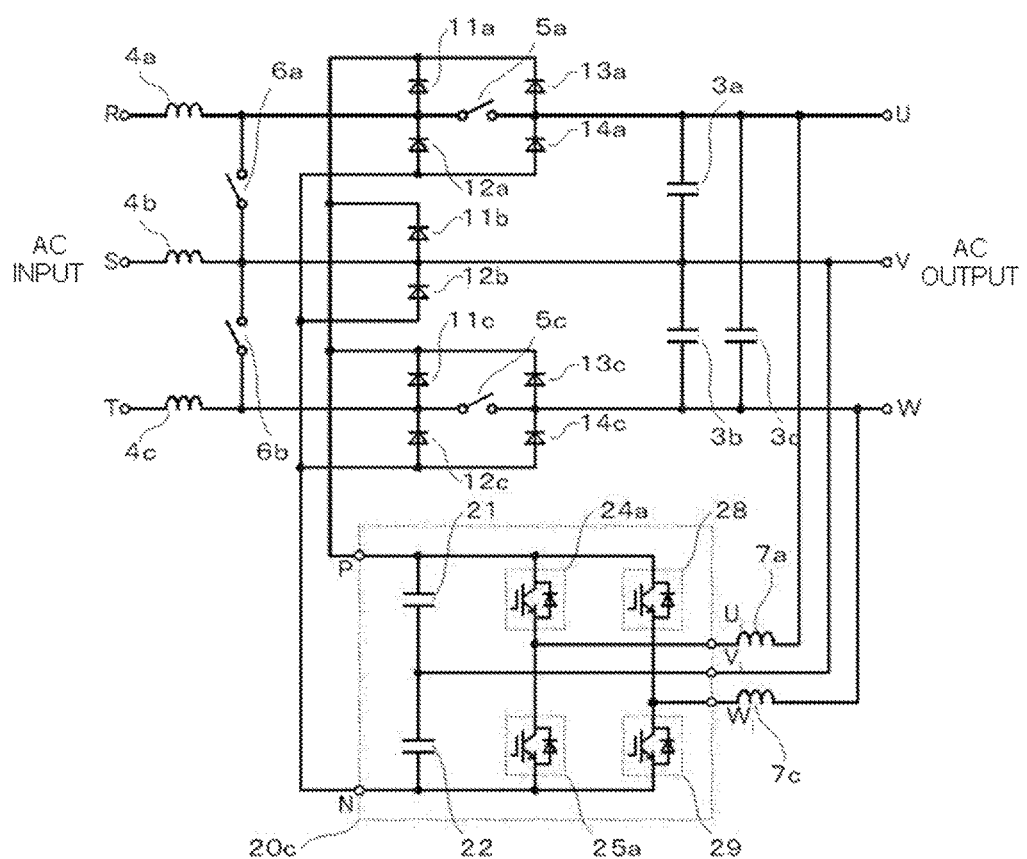
FIG. 5 is a circuit diagram showing a seventh embodiment of the invention.

FIG. 5 shows the power conversion device according to Example 7 of the invention. The drive control unit 71 corresponds to a main circuit, which is different from Example 1, but a drawing thereof is omitted.

As the power conversion device according to Example 7 is such that Example 5 is applied to a three-phase circuit, the basic configuration is the same as that of Example 5.

The example shown in FIG. 5 is configured so that the step-up/step-down chopper unit 10 and inverter unit 20*a* are each of three phases and delta connected, and a connection point of the storage elements 21 and 22 is connected to a V-phase output. The configuration of the inverter unit 20*c* not being limited by this either, it may, for example, have three levels and be delta connected, as shown in FIG. 4.

Basic operations of the power conversion device according to Example 7 are the same as Operating Modes 1 to 7 of Examples 1 to 4.

Example 7 too is such that it is possible to realize a balance between voltage compensation over a wide range of alternating current power source voltage fluctuation and suppressing bidirectional switching element surge voltage.

What is claimed is:
1. A power conversion device, comprising:
 a first circuit wherein a first inductor and a first bidirectional switching element are directly connected;
 a second circuit, connected in parallel to the first bidirectional switching element, wherein a second bidirectional switching element and a capacitor are connected;
 a serial switching element wherein 2N (N being a positive integer) switching elements, in each of which a diode is connected in anti-parallel, are connected in series;
 a serial storage element including first and second storage elements connected in series, the serial storage element being connected in parallel to the serial switching element;
 a first serial rectifier element, connected in parallel to the serial storage element, wherein first and second rectifier elements are connected in series; and
 a second inductor directly connected from an intermediate point of the 2N switching elements to a connection point of the second bidirectional switching element and the capacitor, wherein
 a connection point of the first and second storage elements is directly connected to a connection point of the first bidirectional switching element and the capacitor,
 a connection point of the first and second rectifier elements is directly connected to a connection point of the first bidirectional switching element and second bidirectional switching element, and
 alternating current applied to the first circuit is converted, and output from both ends of the capacitor.
2. The power conversion device according to claim 1, further comprising:
 a second serial rectifier element, connected in parallel to the first serial rectifier element, wherein third and fourth rectifier elements are connected in series, wherein a connection point of the third and fourth rectifier elements is connected to the connection point of the second bidirectional switching element and the capacitor.

3. The power conversion device according to claim 1, further comprising:
voltage detection means that detects a voltage value of the alternating current; and
a drive control unit that drives each of the first and second bidirectional switches and first and second switching elements,
the drive control unit including
a first mode that, when the alternating current voltage value detected by the voltage detection means is within a predetermined first voltage range, turns off the first bidirectional switching element, turns on the second bidirectional switching element, and drives the 2N switching elements to step-up the alternating current, thereby maintaining a voltage of the serial storage element at a predetermined voltage value,
a second mode that, when the alternating current voltage value is within a predetermined second voltage range lower than the first voltage range, drives the first and second bidirectional switching elements to step-up the alternating current and apply it to the capacitor, thereby maintaining the voltage of the capacitor at the predetermined voltage value, and drives the 2N switching elements to step-up the alternating current, thereby maintaining the voltage of the serial storage element at the predetermined voltage value,
a third mode that, when the alternating current voltage value is lower than the second voltage range, turns off the first and second bidirectional switching elements, and drives the 2N switching elements, thereby maintaining the voltage of the capacitor at the predetermined voltage value using power stored in the serial storage element, and
a fourth mode that, when the alternating current voltage value is higher than the first voltage range, turns off the first bidirectional switch and drives the second bidirectional switch to step-down the alternating current, thereby maintaining the voltage of the capacitor at the predetermined voltage value, and drives the 2N switching elements to step-up the alternating current, thereby maintaining the voltage of the serial storage element at the predetermined voltage value.

4. The power conversion device according to claim 3, wherein
the drive control unit includes a fifth mode that, when the alternating current voltage value is within a predetermined third voltage range lower than the second voltage range, and a time is within a predetermined time, turns off the second bidirectional switch and drives the first bidirectional switch to step-up the alternating current, thereby maintaining the voltage of the serial storage element at the predetermined voltage value, and drives the 2N switching elements, thereby maintaining the voltage of the capacitor at the predetermined voltage value using power stored in the serial storage element.

5. The power conversion device according to claim 3, wherein
the drive control unit includes a sixth mode that, when the alternating current voltage value is within a predetermined third voltage range lower than the second voltage range, a time is within a predetermined time, and the voltage phase of the alternating current is synchronous with the voltage phase of the capacitor, drives the first and second bidirectional switching elements to step-up the alternating current, and drives the 2N switching elements, thereby maintaining the voltage of the capacitor at the predetermined voltage value using power stored in the serial storage element.

6. The power conversion device according to claim 4, wherein
the drive control unit includes a sixth mode that, when the alternating current voltage value is within a predetermined third voltage range lower than the second voltage range, the time is within the predetermined time, and the voltage phase of the alternating current is synchronous with the voltage phase of the capacitor, drives the first and second bidirectional switching elements to step-up the alternating current, and drives the 2N switching elements, thereby maintaining the voltage of the capacitor at the predetermined voltage value using power stored in the serial storage element.

7. The power conversion device according to claim 1, further comprising
a frequency detection means that detects the frequency of the alternating current,
a drive control unit including
a seventh mode that, when an alternating current voltage value is within, or higher than, a second voltage range and the frequency detection means detects that the voltage value is deviating from a predetermined frequency range, turns off the second bidirectional switch and drives the first bidirectional switch to step-up or step-down the alternating current, thereby maintaining the voltage of the serial storage element at the predetermined voltage value, and drives the 2N switching elements, thereby maintaining the voltage of the capacitor at the predetermined voltage value using power stored in the serial storage element.

8. The power conversion device according to claim 1, further comprising:
a frequency detection means that detects the frequency of the alternating current,
the drive control unit including
a seventh mode that, when the alternating current voltage value is within, or higher than, the second voltage range and the frequency detection means detects that the voltage value is deviating from a predetermined frequency range, turns off the second bidirectional switch and drives the first bidirectional switch to step-up or step-down the alternating current, thereby maintaining the voltage of the serial storage element at the predetermined voltage value, and drives the 2N switching elements, thereby maintaining the voltage of the capacitor at the predetermined voltage value using power stored in the serial storage element.

9. The power conversion device according to claim 4, further comprising:
a frequency detection means that detects the frequency of the alternating current,
the drive control unit including
a seventh mode that, when the alternating current voltage value is within, or higher than, the second voltage range and the frequency detection means detects that the voltage value is deviating from a predetermined frequency range, turns off the second bidirectional switch and drives the first bidirectional switch to step-up or step-down the alternating current, thereby maintaining the voltage of the serial storage element at the predetermined voltage value, and drives the 2N switching elements, thereby maintaining the voltage of the capacitor at the predetermined voltage value using power stored in the serial storage element.

10. The power conversion device according to claim 5, further comprising:
a frequency detection means that detects the frequency of the alternating current,
the drive control unit including
a seventh mode that, when the alternating current voltage value is within, or higher than, the second voltage range and the frequency detection means detects that the voltage value is deviating from a predetermined frequency range, turns off the second bidirectional switch and drives the first bidirectional switch to step-up or step-down the alternating current, thereby maintaining the voltage of the serial storage element at the predetermined voltage value, and drives the 2N switching elements, thereby maintaining the voltage of the capacitor at the predetermined voltage value using power stored in the serial storage element.

11. The power conversion device according to claim 6, further comprising:
a frequency detection means that detects the frequency of the alternating current,
the drive control unit including
a seventh mode that, when the alternating current voltage value is within, or higher than, the second voltage range and the frequency detection means detects that the voltage value is deviating from a predetermined frequency range, turns off the second bidirectional switch and drives the first bidirectional switch to step-up or step-down the alternating current, thereby maintaining the voltage of the serial storage element at the predetermined voltage value, and drives the 2N switching elements, thereby maintaining the voltage of the capacitor at the predetermined voltage value using power stored in the serial storage element.

12. The power conversion device according to claim 1, further comprising: a third bidirectional switch connected from the intermediate point of the 2N switching elements to the connection point of the first and second storage elements.

13. The power conversion device according to claim 12, further comprising:
a voltage detection means that detects a voltage value of the alternating current; and
a drive control unit that drives each of the first and second bidirectional switches and first and second switching elements,
the drive control unit including
a first mode that, when the alternating current voltage value detected by the voltage detection means is within a predetermined first voltage range, turns off the first bidirectional switch, turns on the second bidirectional switch, and drives so as to turn on any one of an upper arm side switching element or lower arm side switching element of the 2N switching elements or the third bidirectional switching element, stepping-up the alternating current and thereby maintaining a voltage of the serial storage element at a predetermined voltage value,
a second mode that, when the alternating current voltage value is within a predetermined second voltage range lower than the first voltage range, drives the first and second bidirectional switching elements to step-up the alternating current and apply it to the capacitor, thereby maintaining the voltage of the capacitor at the predetermined voltage value, and drives so as to turn on any one of the upper arm side switching element or lower arm side switching element of the 2N switching elements or the third bidirectional switching element, stepping-up the alternating current and thereby maintaining the voltage of the serial storage element at the predetermined voltage value,
a third mode that, when the alternating current voltage value is lower than the second voltage range, turns off the first and second bidirectional switching elements, and drives so as to turn on any one of the upper arm side switching element or lower arm side switching element of the 2N switching elements or the third bidirectional switching element, thereby maintaining the voltage of the capacitor at the predetermined voltage value using power stored in the serial storage element, and
a fourth mode that, when the alternating current voltage value is higher than the first voltage range, turns off the first bidirectional switch and drives the second bidirectional switch to step-down the alternating current, thereby maintaining the voltage of the capacitor at the predetermined voltage value, and drives so as to turn on any one of the upper arm side switching element or lower arm side switching element of the 2N switching elements or the third bidirectional switching element, stepping-up the alternating current and thereby maintaining the voltage of the serial storage element at the predetermined voltage value.

14. The power conversion device according to claim 13, wherein
the drive control unit includes a fifth mode that, when the alternating current voltage value is within a predetermined third voltage range lower than the second voltage range, and a time is within a predetermined time, turns off the second bidirectional switch and drives the first bidirectional switch to step-up the alternating current, thereby maintaining the voltage of the serial storage element at the predetermined voltage value, and drives so as to turn on any one of the upper arm side switching element or lower arm side switching element of the 2N switching elements or the third bidirectional switching element, thereby maintaining the voltage of the capacitor at the predetermined voltage value using power stored in the serial storage element.

15. The power conversion device according to claim 13, wherein
the drive control unit includes a sixth mode that, when the alternating current voltage value is within a predetermined third voltage range lower than the second voltage range, a time is within a predetermined time, and the voltage phase of the alternating current is synchronous with the voltage phase of the capacitor, drives the first and second bidirectional switching elements to step-up the alternating current within a range not exceeding the rated current value of each of the first bidirectional switch and first inductor, and drives so as to turn on any one of the upper arm side switching element or lower arm side switching element of the 2N switching elements or the third bidirectional switching element, thereby maintaining the voltage of the capacitor at the predetermined voltage value using power stored in the serial storage element.

16. The power conversion device according to claim 14, wherein
the drive control unit includes a sixth mode that, when the alternating current voltage value is within a predetermined third voltage range lower than the second voltage range, a time is within a predetermined time, and the voltage phase of the alternating current is synchronous with the voltage phase of the capacitor, drives the first and second bidirectional switching elements to step-up the alternating current within a range not exceeding the rated current value of each of the first bidirectional switch and first inductor, and drives so as to turn on any one of the upper arm side switching element or lower arm side switching element of the 2N switching elements or the third bidirectional switching element, thereby maintaining the voltage of the capacitor at the predetermined voltage value using power stored in the serial storage element.

17. The power conversion device according to claim 12, further comprising:
a frequency detection means that detects the frequency of the alternating current,
a drive control unit including
a seventh mode that, when an alternating current voltage value is within, or higher than, a second voltage range and the frequency detection means detects that the voltage value is deviating from a predetermined frequency range, turns off the second bidirectional switch and drives the first bidirectional switch to step-up or step-down the alternating current, thereby maintaining the voltage of the serial storage element at the predetermined voltage value, and drives so as to turn on any one of the upper arm side switching element or lower arm side switching element of the 2N switching elements or the third bidirectional switching element, thereby maintaining the voltage of the capacitor at the predetermined voltage value using power stored in the serial storage element.

18. The power conversion device according to claim 13, further comprising:
a frequency detection means that detects the frequency of the alternating current,
the drive control unit including
a seventh mode that, when the alternating current voltage value is within, or higher than, the second voltage range and the frequency detection means detects that the voltage value is deviating from a predetermined frequency range, turns off the second bidirectional switch and drives the first bidirectional switch to step-up or step-down the alternating current, thereby maintaining the voltage of the serial storage element at the predetermined voltage value, and drives so as to turn on any one of the upper arm side switching element or lower arm side switching element of the 2N switching elements or the third bidirectional switching element, thereby maintaining the voltage of the capacitor at the predetermined voltage value using power stored in the serial storage element.

19. The power conversion device according to claim 14, further comprising:
a frequency detection means that detects the frequency of the alternating current,
the drive control unit including
a seventh mode that, when the alternating current voltage value is within, or higher than, the second voltage range and the frequency detection means detects that the voltage value is deviating from a predetermined frequency range, turns off the second bidirectional switch and drives the first bidirectional switch to step-up or step-down the alternating current, thereby maintaining the voltage of the serial storage element at the predetermined voltage value, and drives so as to turn on any one of the upper arm side switching element or lower arm side switching element of the 2N switching elements or the third bidirectional switching element, thereby maintaining the voltage of the capacitor at the predetermined voltage value using power stored in the serial storage element.

20. The power conversion device according to claim 15, further comprising:
a frequency detection means that detects the frequency of the alternating current,
the drive control unit including
a seventh mode that, when the alternating current voltage value is within, or higher than, the second voltage range and the frequency detection means detects that the voltage value is deviating from a predetermined frequency range, turns off the second bidirectional switch and drives the first bidirectional switch to step-up or step-down the alternating current, thereby maintaining the voltage of the serial storage element at the predetermined voltage value, and drives so as to turn on any one of the upper arm side switching element or lower arm side switching element of the 2N switching elements or the third bidirectional switching element, thereby maintaining the voltage of the capacitor at the predetermined voltage value using power stored in the serial storage element.

21. The power conversion device according to claim 16, further comprising:
a frequency detection means that detects the frequency of the alternating current,
the drive control unit including
a seventh mode that, when the alternating current voltage value is within, or higher than, the second voltage range and the frequency detection means detects that the voltage value is deviating from a predetermined frequency range, turns off the second bidirectional switch and drives the first bidirectional switch to step-up or step-down the alternating current, thereby maintaining the voltage of the serial storage element at the predetermined voltage value, and drives so as to turn on any one of the upper arm side switching element or lower arm side switching element of the 2N switching elements or the third bidirectional switching element, thereby maintaining the voltage of the capacitor at the predetermined voltage value using power stored in the serial storage element.

* * * * *

UNITED STATES PATENT AND TRADEMARK OFFICE
CERTIFICATE OF CORRECTION

| | | |
|---|---|---|
| PATENT NO. | : 9,571,001 B2 | Page 1 of 1 |
| APPLICATION NO. | : 13/939852 | |
| DATED | : February 14, 2017 | |
| INVENTOR(S) | : Satoru Fujita et al. | |

It is certified that error appears in the above-identified patent and that said Letters Patent is hereby corrected as shown below:

On the Title Page

Please correct Item (72) Inventor: to add the second inventor named Ryuji YAMADA, Hachioji (JP).

Signed and Sealed this
Thirtieth Day of May, 2017

Michelle K. Lee
*Director of the United States Patent and Trademark Office*